US012456316B2

United States Patent
Sambhy et al.

(10) Patent No.: US 12,456,316 B2
(45) Date of Patent: Oct. 28, 2025

(54) METHODS AND SYSTEMS FOR DOCUMENT AUTHENTICATION USING INK SATELLITES

(71) Applicant: Xerox Corporation, Norwalk, CT (US)

(72) Inventors: Varun Sambhy, Pittsford, NY (US); Eliud Robles Flores, Rochester, NY (US); Guo-Yau Lin, The Woodlands, TX (US)

(73) Assignee: Xerox Corporation, Norwalk, CT (US)

( * ) Notice: Subject to any disclaimer, the term of this patent is extended or adjusted under 35 U.S.C. 154(b) by 301 days.

(21) Appl. No.: 18/366,615

(22) Filed: Aug. 7, 2023

(65) Prior Publication Data

US 2025/0054323 A1 Feb. 13, 2025

(51) Int. Cl.
 *G06V 20/80* (2022.01)
 *G06V 20/00* (2022.01)

(52) U.S. Cl.
 CPC .............. *G06V 20/80* (2022.01); *G06V 20/95* (2022.01)

(58) Field of Classification Search
 None
 See application file for complete search history.

(56) References Cited

U.S. PATENT DOCUMENTS

| | | | | |
|---|---|---|---|---|
| 7,533,062 B2 * | 5/2009 | Sanchez | ............. | H04N 1/00068 283/73 |
| 7,731,435 B2 | 6/2010 | Piersol et al. | | |
| 7,744,002 B2 * | 6/2010 | Jones | ......................... | C09J 9/00 235/487 |
| 7,847,981 B2 * | 12/2010 | Igarashi | ............. | H04N 1/00843 399/388 |
| 7,963,449 B2 * | 6/2011 | Jones | .................... | B42D 25/23 235/487 |

(Continued)

FOREIGN PATENT DOCUMENTS

JP 2007537523 A 12/2007

OTHER PUBLICATIONS

K. P. Wijewardena, S. A Grosz, K. Cao and A K. Jain, "Fingerprint Template Invertibility: Minutiae vs. Deep Templates," in IEEE Transactions on Information Forensics and Security, vol. 18, pp. 744-757, 2023.

(Continued)

*Primary Examiner* — Anand P Bhatnagar
(74) *Attorney, Agent, or Firm* — Fox Rothschild LLP (57) ABSTRACT

Systems and methods for verifying the authenticity of a printed document are disclosed. The methods include receiving an identification of a portion of the printed document that includes a document signature, and receiving a document signature corresponding to the printed document from a data store. The document signature includes images of one or more first satellite droplet patterns (SDPs) that each include a plurality of ink satellite droplets that were randomly formed during printing of a print image on the printed document. The methods further include receiving an image of the portion of the printed document, analyzing the image to identify one or more second SDPs in the printed document, and authenticating the printed document by determining whether at least some the one or more first SDPs match a corresponding one or more second SDPs.

20 Claims, 7 Drawing Sheets

(56) References Cited

U.S. PATENT DOCUMENTS

| | | | | |
|---|---|---|---|---|
| 8,033,477 | B2* | 10/2011 | Jones | H04N 1/32133 |
| | | | | 235/487 |
| 8,265,381 | B2* | 9/2012 | Ito | G03G 21/04 |
| | | | | 382/165 |
| 8,316,425 | B2* | 11/2012 | Cattrone | H04N 1/32101 |
| | | | | 726/7 |
| 8,634,066 | B1* | 1/2014 | Fraser | G07D 7/0043 |
| | | | | 356/71 |
| 8,736,908 | B2* | 5/2014 | Yeap | G06V 30/1444 |
| | | | | 382/100 |
| 9,569,650 | B2* | 2/2017 | Hanina | G06T 7/48 |
| 9,594,994 | B2* | 3/2017 | Biró | G06K 19/06037 |
| 12,041,138 | B1 | 7/2024 | Mahajan et al. | |
| 2008/0205766 | A1* | 8/2008 | Ito | H04N 1/32106 |
| | | | | 382/192 |
| 2011/0045255 | A1* | 2/2011 | Jones | C09J 7/38 |
| | | | | 525/418 |
| 2013/0161387 | A1* | 6/2013 | King | G07D 7/005 |
| | | | | 235/431 |
| 2013/0173484 | A1* | 7/2013 | Wesby | G06K 7/1417 |
| | | | | 705/318 |
| 2015/0351068 | A1 | 12/2015 | Deleeuw et al. | |
| 2016/0321830 | A1 | 11/2016 | Cvetkovic et al. | |
| 2016/0358010 | A1 | 12/2016 | Yang et al. | |
| 2020/0193117 | A1 | 6/2020 | Raff | |
| 2022/0052768 | A1 | 2/2022 | Farrar et al. | |
| 2023/0119262 | A1 | 4/2023 | Barnett | |

OTHER PUBLICATIONS

A Ross, J. Shah and A K. Jain, "From Template to Image: Reconstructing Fingerprints from Minutiae Points," in IEEE Transactions on Pattern Analysis and Machine Intelligence, vol. 29, No. 4, pp. 544-560, Apr. 2007.

* cited by examiner

METHODS AND SYSTEMS FOR DOCUMENT AUTHENTICATION USING INK SATELLITES

BACKGROUND

Current document authentication and counterfeit prevention systems are frequently based on the use of digital watermarks. Digital watermarking is a technique which allows a user to add information (e.g., copyright notices, security codes, identification data, etc.) to digital image signals and documents. However, such techniques, while suitable for digital documents, are often not sufficiently robust to allow detection of the marks in hardcopies, i.e., when the digital document is rendered in physical form. Machine-readable information in the form of watermarks, barcodes, hidden patterns such as microtext, and other types of security marks or signatures have been embedded into images and/or otherwise applied on physical documents document identification and authenticity verification. The machine-readable information is generally invisible or visually unobtrusive and may be decoded by a device which is capable of reading the information.

However, such application of machine-readable information (i.e., a signature) on a physical document requires a rendering device such as a printer to perform special steps (e.g., make special markings, use a different toner, etc.) for deliberate addition of the information. Moreover, use of such machine-readable information as a signature remains vulnerable to reverse engineering. And, once a counterfeiter learns to emulate or reproduce the machine-readable information, it becomes defunct and obsolete for authentication purposes. In addition, detection of these types of machine-readable based signatures may require specialized analytical equipment, which is not easily accessible to distributors and end-users.

This patent document describes methods and systems for addressing these and other technical challenges.

SUMMARY

In certain aspects, systems and methods for Systems and methods for verifying the authenticity of a printed document are disclosed. The systems may include a processor and a non-transitory computer readable medium including programming instructions that cause the processor to perform the methods. The methods may include receiving an identification of a portion of the printed document that includes a document signature, and receiving a document signature corresponding to the printed document from a data store. The document signature may include images of one or more first satellite droplet patterns (SDPs) that each include a plurality of ink satellite droplets that were randomly formed during printing of a print image on the printed document. The methods may further include receiving an image of the portion of the printed document, analyzing the image to identify one or more second SDPs in the printed document, and authenticating the printed document by determining whether at least some the one or more first SDPs match a corresponding one or more second SDPs.

In various embodiments, the methods may also include determining that the printed document is not an authentic document if the subset of the one or more first SDPs does not match the corresponding subset of the one or more second SDPs. Optionally, the methods may include analyzing portions of the subset of the one or more first SDPs that do not match the corresponding subset of the one or more second SDPs for identifying portions of the printed document that have been altered from an original printed document.

In some embodiments, the methods may also include selecting the portion that includes the document signature with the one or more first SDPs by analyzing an image of an original printed document, generating the document signature to include images of the one or more first SDPs, and storing the document signature in the data store in association with a document identifier of the original printed document and the identification of the portion. Optionally, the portion may be selected by selecting a predefined location within the original printed document. Additionally and/or alternatively, selecting the one or more first SDPs by analyzing the image of the original printed document can include selecting the one or more first SDPs such that each of the one or more first SDPs is unduplicable. Optionally, selecting each of the one or more first SDPs may be selected based on, for example and without limitation, a density of ink satellite droplets in a SDP, a number of ink satellite droplets in a SDP, sizes of ink satellite droplets in a SDP, size of a SDP, a location of a SDP in the original printed document, image quality of a SDP, spatial configuration of a SDP, a color of a SDP, and/or a shape of a SDP.

In some embodiments, the methods may also include causing a print device to create the original printed document to include the one or more first SDPs by controlling an energy pulse applied to a print nozzle of the print device for selective enhancement of ink satellite droplets.

Optionally, retrieving the document signature from the data store may include using a document identifier associated with the printed document for retrieving the document signature.

In various embodiments, analyzing the image to identify the one or more first SDPs in the printed document may include identifying the one or more first SDPs based on, for example and without limitation, a density of ink satellite droplets in a SDP, a number of ink satellite droplets in a SDP, sizes of ink satellite droplets in a SDP, size of a SDP, location of a SDP in the original printed document, image quality of a SDP, a color of a SDP, or a shape of a SDP.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." When used in this document, the term "exemplary" is intended to mean "by way of example" and is not intended to indicate that a particular exemplary item is preferred or required.

In this document, when terms such as "first" and "second" are used to modify a noun, such use is simply intended to distinguish one item from another and is not intended to require a sequential order unless specifically stated.

Additional terms that are relevant to this disclosure will be defined at the end of this Detailed Description section.

The issues of authentication and counterfeit deterrence can be important in many contexts. Bills of currency, stock and bond certificates, credit cards, passports, bills of lading, as well as many other legal documents (e.g., deeds, wills, etc.) all must be reliably authentic to be useful. As discussed above, signatures included in a document for authentication, in addition to requiring additional steps/materials for printing, may be duplicated and reverse engineered. This document describes systems and methods for document authentication (or validation) and counterfeit prevention based on unique ink satellite drop patterns formed on a print document.

During ink jet printing, an output is created by a plurality of primary ink droplets emitted during an energizing sequence to ink emitting nozzles of print cartridges disposed in an ink jet print engine. Such primary droplets are typically accompanied by secondary and tertiary ink ("ink satellite" or "satellite") droplets which create print artifacts (which may or may not be visible to the human eye) when said satellite droplets register upon a print substrate at locations other than a desired primary mark location. A primary droplet is emitted under precise electronic control, typically as a result of an energy pulse received by an ink emitting nozzle to impart a preselected trajectory and time of flight to the primary droplet such that once energized a primary ink droplet accelerates toward a preselected location on a print substrate, typically trailed by one or more satellite droplets. For example, a pressure pulse may be applied to deflect a piezo actuator where such deflection causes the formation of a wave within an ink emitting nozzle for emission of primary droplets. Typically, satellite droplets form at the tail of the primary droplet and may precede or trail each primary droplet in flight. Specifically, it is likely that not all of the ink ejected from a nozzle will impact the print substrate as a single spot. Rather, small droplets or satellites that move slower than the primary droplets will be scattered in the vicinity of the primary droplet. Although in practice some satellite droplets may merge back into a primary droplet, at least a portion of said satellite droplets often register on the print substrate outside a boundary of each primary mark created by each primary droplet to create random and unique satellite droplet patterns (SDPs).

Satellite droplet formation, size, location, and pattern on a print document is mostly random and cannot be controlled. Even sequential prints of exact same image printed together will have different satellite droplet patterns. However, certain energy pulses are known to generate higher number of satellite droplets and/or satellite droplets within specific size ranges.

Such SDPs may be imaged using a suitable imaging device. For example, satellite drops on a paper substrate are typically 1-10 micron in spot size, and may be detected and imaged using a microscope imaging device of suitable magnification (e.g., 10× magnification or more). However, the complex, unique, and random SDPs formed on a printed document cannot be duplicated by any practicable means. The present document, therefore, employs the SDPs formed on a printed document as a document signature (or fingerprint) for authentication and counterfeit prevention. Note that an SDP occurs mostly randomly during the printing process (without control of the location and spatial configuration) and is, therefore, used to provide a basis for identification data. Such a randomly occurring characteristic is distinct from the operation of deliberate printing or otherwise embedding authentication information in a document. It is the inherent random character of SDPs that is measurable (i.e., can be imaged) but substantially unduplicable or unclonable that makes them suitable to act as authenticating and/or anti-counterfeiting signatures. In certain examples, this disclosure fingerprints (i.e., creates a unique document signature for) a printed document using the SDPs inherently formed during the printing process for anti-counterfeiting and authentication purposes.

The discussion below describes a method that will improve automatic fake document detection based on SDPs created inherently during printing. In some implementations, a system may use image processing to characterize SDPs formed on a document during printing as part of automatic fake document detection (i.e., authentication). In some other implementations characterization of the SDPs formed on a document may also be used for preventing creation of counterfeit documents because of the unduplicable nature of the SDPs.

In some implementations, the method described below improves the performance of document authentication and/or counterfeit prevention. It can be used as a standalone method for document authentication and/or counterfeit prevention or in conjunction with other methods to increase overall performance.

Figures 1A, 1B:
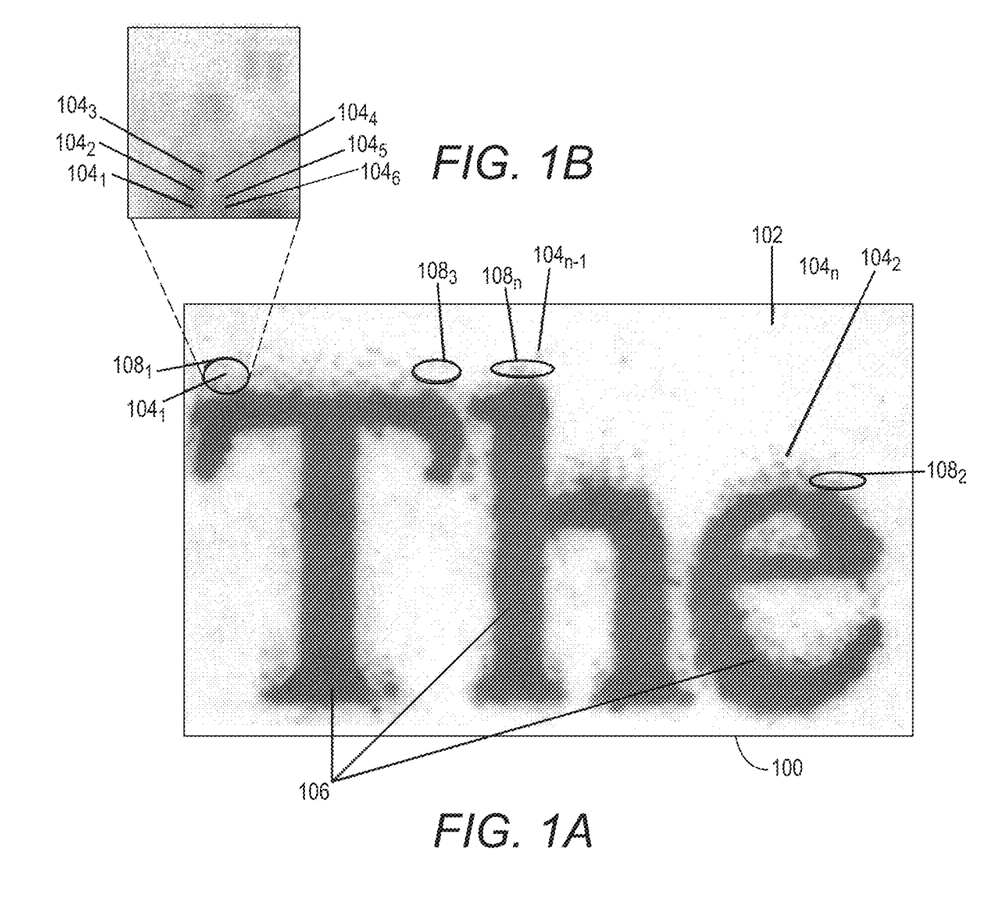
FIG. 1A illustrates an example document including satellite droplets.
FIG. 1B illustrates a close up view of an example satellite droplet patterns (SDP) of the document of FIG. 1A.

FIG. 1A illustrates an example printed document 100 that includes one or more satellite drop patterns (SDPs) 108$_1$ to 108$_n$ (collectively, 108) that are generated via a printing process. While the SDPs 108 are illustrated as being printed on the document 100, the SDP 108 may be printed on any surface, including a packaging, a part, a surface of a device or housing, and the like. As discussed, a printer applying an image 106 typically introduces a significant amount of satellite droplets that are too small to affect the readability of the overt data coded by the image, and are too small for their appearance to be controllable in the printing process, but are visible (possibly only under magnification) and durable. If a particular printer does not naturally produce a good supply of satellite droplets, some printers can be caused to include random or pseudorandom variations in their satellite droplet output (as discussed below).

In one embodiment, the document 100 may include a substrate 102. The substrate 102 may be paper, cardboard, plastic, or any other type of surface that can receive a printing fluid (e.g., ink, toner) used to print an image 106. In one embodiment, the printing fluid may be dispensed over the substrate 102 to form an image 106. Inherently with the printing of the image 106, a plurality of satellite droplets 104$_1$ to 104$_n$ may be deposited on the substrate 102 to form one or more SDPs 108. The arrangement of the plurality of satellite droplets 104$_1$ to 104$_n$ of an SDP 108 may form any conceivable pattern or shape (e.g., square, rectangle, oval, irregular shape, and the like). As discussed above, the size of a satellite droplet may be a few microns, and an SDP may be imaged using an imaging device of suitable magnification.

As discussed above, the satellite droplets are formed at the tail end of a primary print fluid droplet, and one or more characteristics the energy pulses (e.g., frequency, amplitude, etc.) used for creation of the primary droplets may be controlled to change the number and/or size of the satellite droplets formed in conjunction with the primary droplets. In certain embodiments, the creation of an SDP in one or more locations on the substrate 102 may, therefore, be enhanced or otherwise controlled. For example, it may be desirable to deposit a certain number of satellite droplets in a location that will be used for document authentication, and a suitable electric pulse may be applied during formation of an image in that location. Furthermore, the size of the satellite droplets in that location may be controlled (e.g., reduced to a size that is not easily visible to the human eye) for preventing detection by a human eye and/or copying via a printing process. Additionally and/or alternatively, the size of the satellite droplets in that location may be controlled such that they can be imaged using an imaging device of desired magnification (i.e., to have a size that is within the resolution of the imaging device to be used).

FIG. 1B illustrates a close-up view of an example SDP $108_1$ formed over the letter "T" in image 106 of FIG. 1A. As shown in FIG. 1B, the example SDP $108_1$ includes six satellite droplets $104_1$ to $104_6$ arranged in proximity of each other to form a unique pattern. The pattern formed by the combination of the printing fluid in the random satellite droplets $104_1$ to $104_6$ and at a particular location of the image 106 (e.g., over the letter "T") may form the SDP $108_1$.

Referring back to FIG. 1A, the SDP $108_2$ may be different from the SDP $108_1$ as the arrangement, number, and sizes of the random satellite droplets in $108_2$ is going to be different from that of SDP $108_1$, as well as non-duplicable. The SDP $108_3$ and the SDP $108_4$ may also have a unique arrangement, number, and size of random satellite droplets, respectively. In other words, each SDP 108 generated at different locations on the substrate 102 may be unique and non-duplicable.

Figure 2:
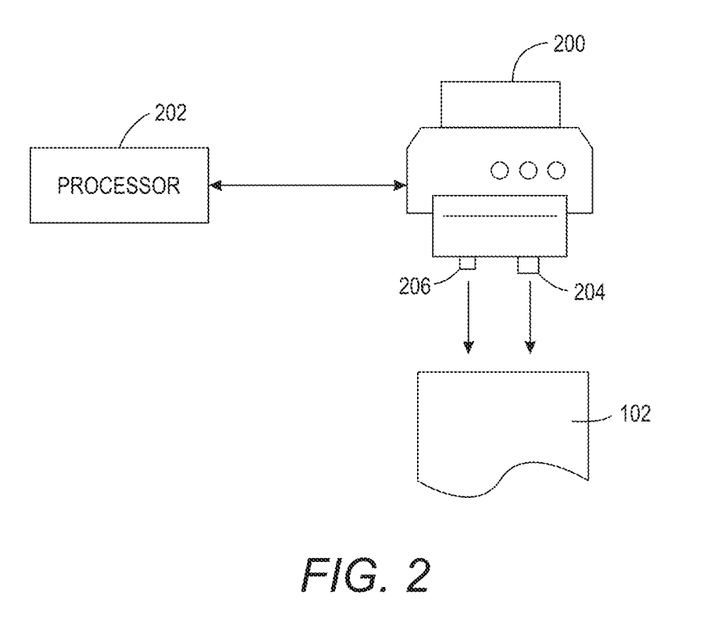
FIG. 2 illustrates an example print system.

FIG. 2 illustrates an example apparatus 200 that may be used to print the image 106 and the SDPs 108 of the present disclosure. In one embodiment, the apparatus 200 may be a printer that includes multiple printheads 204 and 206. The printheads 204 and 206 may be used to dispense different fluids. For example, a storage container 208 may store printing fluid that is dispensed via the printhead 206.

In one embodiment, a processor 202 may be communicatively coupled to the printheads 204 and 206 to control dispensing of the printing fluid. In one embodiment, the substrate 102 may be passed below the printheads 204 and 206 or the printheads 204 and 206 may be moved over the substrate 102. For example, the processor 202 may control generation of the energy pulses for ejection of the printing fluid from the printheads 204 and 206, in order to control the location, number and/or size of the satellite drops formed on the substrate 102 (as discussed above).

It should be noted that the apparatus 200 has been simplified for ease of explanation and may include additional components which are not shown. For example, the apparatus 200 may include a motor to move the printheads 204 and 206, a memory to store instructions, a power supply, other electrical components, and the like.

Figure 3:
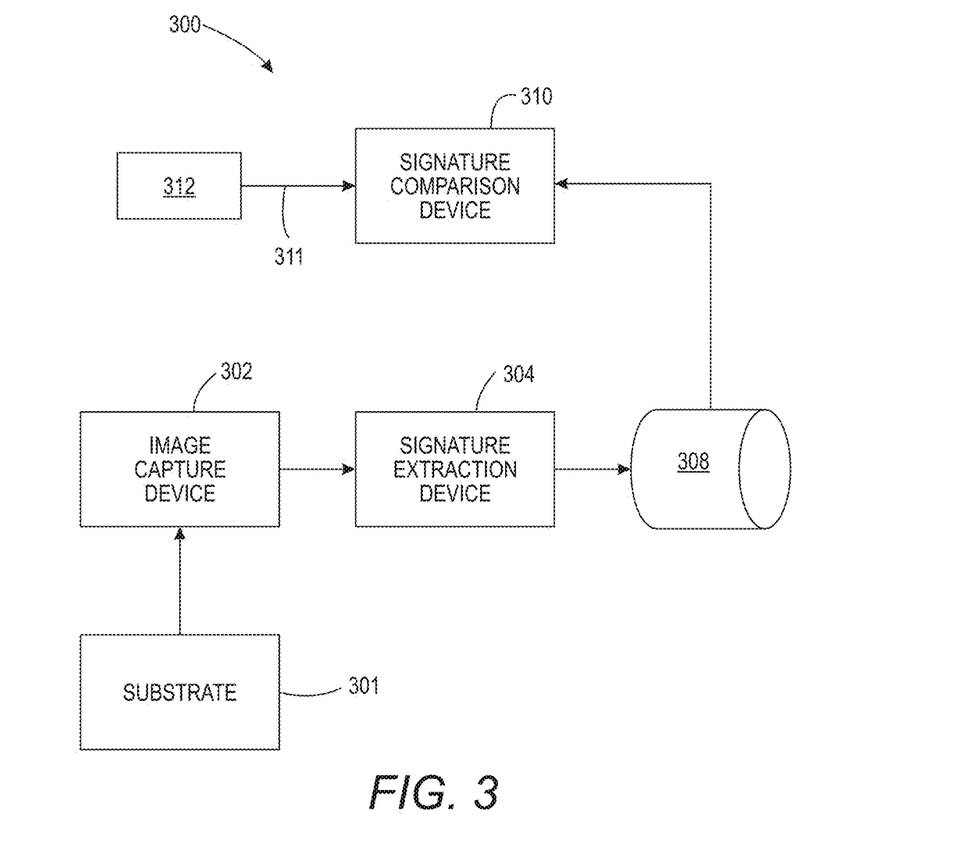
FIG. 3 illustrates an example system for using SDPs for document authentication.

Referring to FIG. 3, a computing system 300 for document authentication using satellite droplets is illustrated. In an example embodiment, at least a portion of the substrate 301 (e.g., substrate 102 of FIG. 1) is imaged using a suitable image capture device 302. The imaging device may be of any now or hereafter known device (e.g., a microscopic image capture device with a suitable magnification and resolution). In some embodiments, the imaging device images the satellite droplets at a level of detail considerably finer than the controllable output of the printer that applied the satellite droplets. If an SDP is being used as an anti-counterfeiting measure, it is strongest if the imaging device gathers data at a level of detail finer than the controllable output of a print device that is likely to be create the printed substrate. However, that may not be necessary if it is possible to keep secret the fact that particular details in a particular SDP are being used for that purpose.

The portion of the printed substrate 301 for imaging may be selected based on, for example, a density or number of satellite droplets, a density of satellite droplets, a size of satellite droplets, patterns of satellite droplets, or the like. For example, the selected portion may include at least a threshold number of satellite droplets, the threshold chosen to ensure (or minimize) that one or more patterns formed by the satellite droplets cannot be cloned or duplicated. In some other embodiments, the selected portion may be predefined such as, without limitation, a printed header, a printed page number in the footer, a printed title, a particular character printed on the substrate (e.g., a particular character printed within a predefined location, a first or last printed instance of a particular character or word, etc.), a predefined area on the substrate (e.g., bottom corner, etc.), or the like. Additionally and/or alternatively, the selected portion may include at least a threshold size of satellite droplets such that the droplets can be suitably imaged using the image capture device 302 and/or are not visible to the human eye. In one or more embodiments, the complete substrate 301 may be imaged, and suitable portions of the image may, optionally, be selected based on size, density, number, resolution, etc.

The image capture device 302 supplies image data to a signature extraction device 304. The signature extraction device 304 may extract one or more SDPs from the image using any now or hereafter known image processing methods. For example, the signature extraction device 304 may select SDPs based on one or more of the following factors: SDPs that have a satellite droplet density or number within a desired range (e.g., a density or number that renders the SDPs unduplicable), include satellite droplets having a size within a particular range (e.g., a size that cannot be deliberately printed using a print device), SDPs meet certain image quality requirements (e.g., image resolution, clarity, etc.), SDPs having a size within a particular range, SDP's that have certain shapes or spatial configurations (e.g., oval, triangular, etc.), SDPs that are formed within certain locations (e.g., within a threshold distance of a printed image and/or certain images, SDPs that are formed within a predetermined location of the substrate that is designated as including the signature SDPs, etc.), SDP's of a certain color, or any other factors that lend the SDPs being unique, random, and/or unduplicable. For example, the SDPs may be selected from within a threshold distance of a page number, a title, a particular character, a header, or the like. Optionally, SDPs formed using predefined color(s) may be selected. The selected SDPs individually and/or in association with one or more of the other selected SDPs (and corresponding images) may form one or more document signatures.

It should be noted that the SDPs and hence the document signature are randomly formed during printing of an image on the substrate, where the SPDs/signature is not included within the image or corresponding data (neither does the image or corresponding data include any instructions or other indications that lead to the formation of particular SDPs/signatures during the printing of data).

The selected SDP's (or document signatures) along with the corresponding image(s) (or image subsets including the selected SDPs) may be stored in a data store in association with a document identifier (of the substrate 301) in a data store 308 (e.g., in a look up table or other database structure). Optionally, information associated with the SDPs may also be store such as, without limitation, location on the substrate, number of satellite droplets and corresponding locations, sizes, pattern or spatial configuration formed, color, etc. The document identifier may be any now or hereafter known identifier such as a document number, document name, author name, or the like. In some embodiments, instead of an image of an SDP, a description of the SDP may be stored and used during the matching step described below.

A signature comparison device 310 may receive (and/or extract) a document signature 311 (i.e., an image including one or more SDPs) from another image capture device 312. The signature comparison device 310 may use a document identifier associated with a document from which the document signature 311 is extracted to retrieve a previously stored signature (in association with the document identifier) from the data store 308. The signature comparison device may use any now or hereafter known image comparison methods to compare the document signature 311 with the previously stored signature. The document signature 311 may be determined to match the previously stored signature if one or more SDPs (or at least a threshold number of SDPs) in the document signature 311 match a corresponding SDP(s) in the previously stored signature and having at least a threshold similarity. A person of ordinary skill in the art will understand that, only a certain number of satellite droplets included in an SDP image (e.g., about 25-75%, about 30-70%, about 40-60%, about 50%, or the like) may be required to determine a match with a previously stored SDP image.

As shown symbolically by the separation between the upper part of FIG. 3, relating to genuine SDP signature capture and storage, and the lower part of FIG. 3, relating to candidate SDP signature capture, comparison, and verification; the two parts may be included in the same computing system or may be included in different computing systems.

A datastore of SDP-based signatures in association with document identifiers can form the basis of a system to track and trace a document, such a system having unique advantages and capabilities that are not available with existing document authentication and anti-counterfeiting methods (as discussed above).

Figure 4:
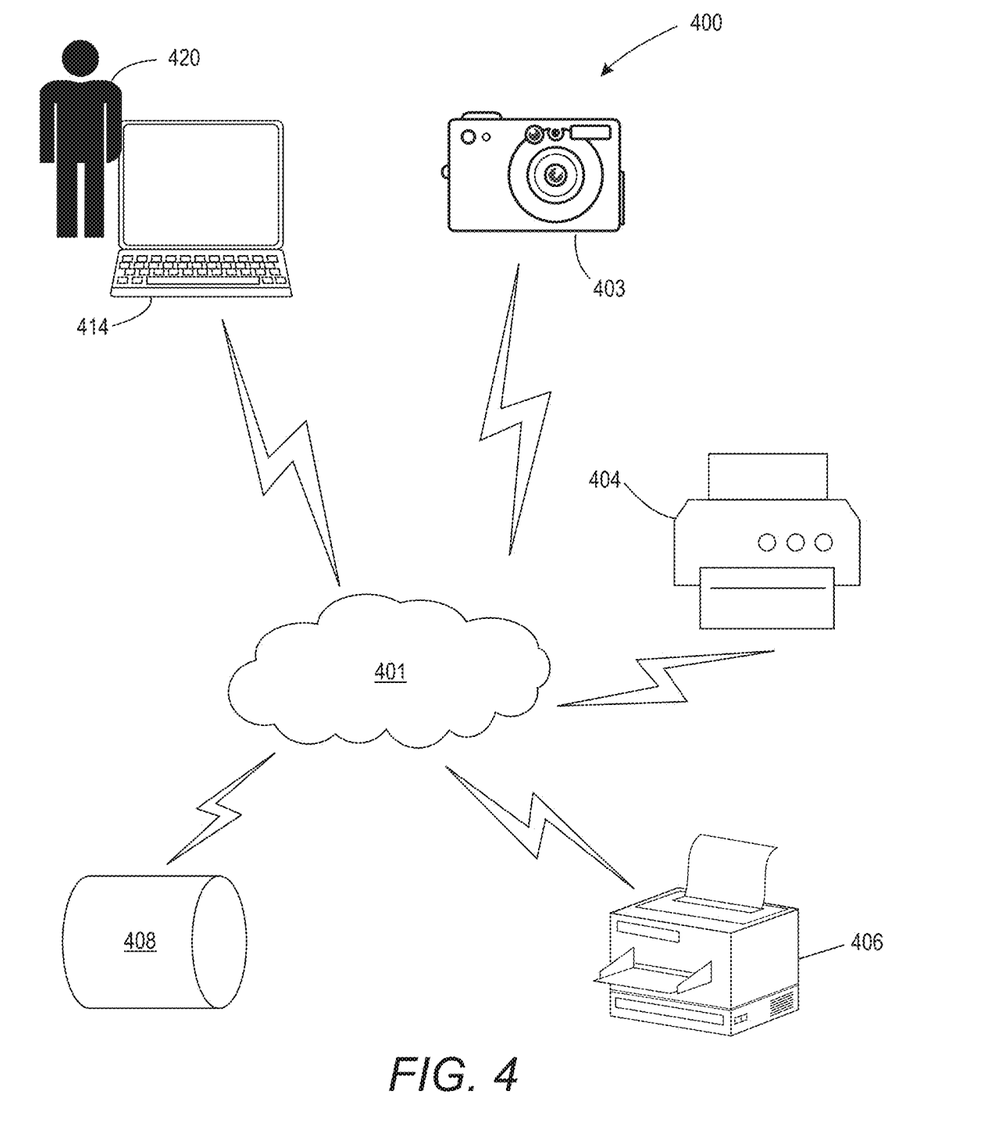
FIG. 4 illustrates an example of various hardware elements that may be used to implement the document authentication system of FIG. 3.

FIG. 4 illustrates an example of various hardware elements that may be used to implement the document authentication system of FIG. 3. System 400 includes or is connected to one or more networks 401. As used in this document, the term "connected" refers to any configuration in which two or more devices may share data, programming instructions or other electronic communications with each other via wired and/or wireless communications. A user 420 accesses the system by one or more computing devices 414, which may execute programming instructions to implement the processes described below, or which may contain and execute software (such as a browser or other portal software) that allows a user to access the system as executed by an external computing device.

The computing device 414 and any number of imaging devices (e.g., a card scanner, flatbed image scanner, microscope cameras, or similar device) 403, and print devices 404 and 406 are communicatively coupled via a network 401.

The system also may include one or more data storage facilities 408, such as a database that resides in a computer-readable memory and serves as a document repository, that includes various data files corresponding to documents, document templates and/or SDP based signatures (or images) that may be available for authentication of a printed document. The data storage facilities 408 may include memory portions that are physically separate from the user's computing device 414 as shown, and/or they may include memory portions that are part of the user's computing device 414.

In certain embodiments, the data files may include copies of printed documents and/or document templates generated by an author from a computing device included in system 400, and sent to a recipient as an electronic document or a hard copy document. For example, a printed document may be mailed or e-mailed to a recipient with the expectation of receiving the printed document back at some point in the future, potentially with additional information added to the secured document. Examples may include bank checks, diploma certificates, tickets, permits, deeds, and other such documents sent to the respective issuing authority (primary recipient). In certain embodiments, the primary recipient may provide the system 400 with data regarding potential secondary recipients, which may include name, address, e-mail, and other contact and permission information. In various embodiments, the primary and/or secondary recipients may be permitted to securely access the SDP based signatures stored in the data storage facilities 408, while preventing unauthorized access (hence, further improving document authentication and preventing counterfeiting). Such information may also be stored as data files in the data storage facilities 408.

The systems described in this document may include implementations that are embodied in a print device, an imaging device, a computing device with a connected print device, a software program a cloud based system, or any combination of these items.

Figure 5:
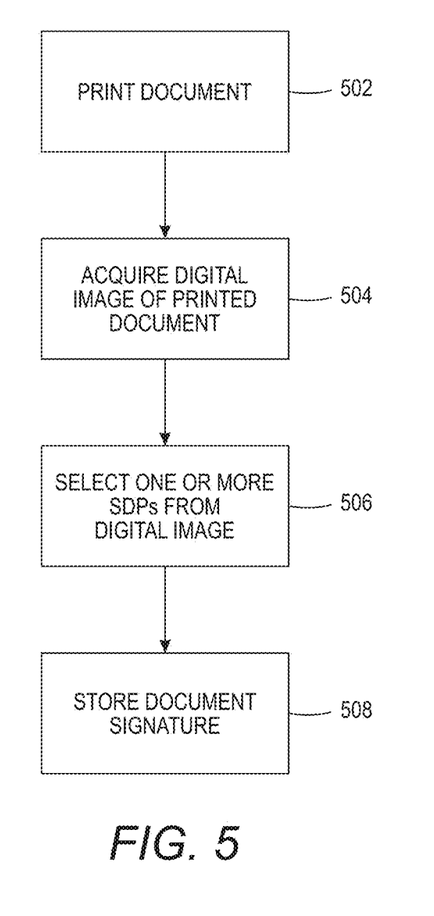
FIG. 5 is a flow diagram that illustrates a method of generating a document signature.

FIG. 5 illustrates an example process by which systems such as those of FIGS. 2-4 may be used for creating and storing an SDP based signature of a printed document. The process in one embodiment includes printing a document (502) and acquiring a digital image of the printed document at step 504 from an imaging device (as discussed above). Next, SDPs included in the digital image is analyzed to select one or more SDPs from the digital image at step 506. As explained above, specific SDPs or regions of interest (e.g., SDPs having a certain size, spatial configuration, pattern, location, color, droplet size, and/or the like) may be selected for subsequent identification or authentication of the document and form the document signature including the selected SDPs. The document signature may be stored in a database record (such as a look up table) in association with the document identifier at step 508. Optionally, information for identification of the portion of the document that includes the document signature may also be stored (e.g., location, character associated with an SDP signature, spatial configuration or pattern of the SDP(s) within the signature, size of the SDP(s) within the signature, criteria that are used for selection of the SDPs during creation of the document signature and/or the like).

Alternatively and/or additionally, the information for identification of the portion of the document that includes the document signature and/or the document signature itself may be transmitted to a user (e.g., via a message, display on a display device, via email, via a URL, or the like).

Figure 6:
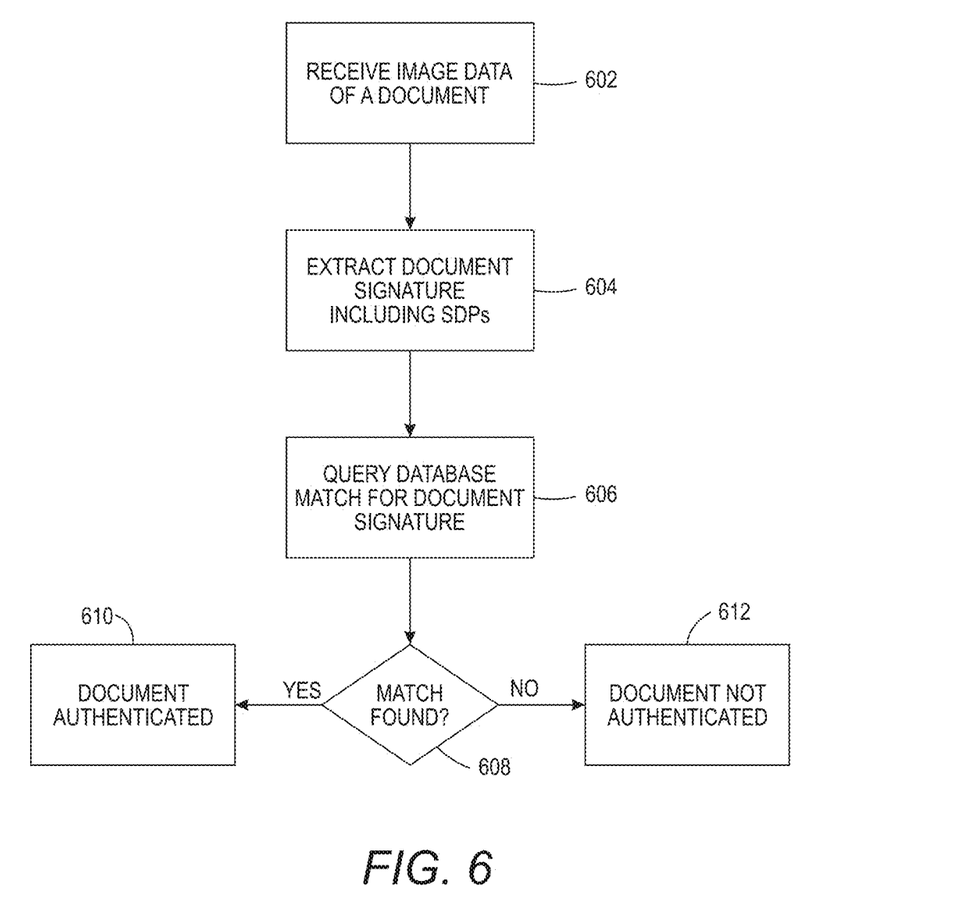
FIG. 6 is a flow diagram that illustrates a method for authenticating a target document.

The system then identifies the authenticates and validates the document, when needed, using the document signature. FIG. 6 illustrates an example process by which systems such as those of FIGS. 2-4 may be used for authenticating a target document by matching a signature of the target document to an existing document signature in a database of document signatures. At 602, the system acquires image data of a "target document" i.e., the document to be authenticated. The system may then extract portions of the acquired image at 604 that include one or more SDPs that may form a document signature. In various other embodiments, the signature forming SDPs may be extracted from the acquired image based on information included within the database record such as, without limitation, the criteria that are used for selection of the SDPs during creation of the document signature (discussed above) density of satellite droplets within the signature, location of satellite droplets within the signature, particular shapes of SDP(s) within the signature, size of satellite droplets and/SDP(s) within the signature, location with respect to an image on the document (e.g., SDPs formed within a threshold distance of certain characters), location with respect to the substrate (e.g., particular regions of the documents), color of the SDPs, or the like. In various other embodiments, the signature forming SDPs may be extracted from the acquired image based on the criteria that are used for selection of the SDPs during creation of the document signature (discussed above) such as, without limitation, density of satellite droplets, location of satellite droplets, particular shapes of SDPs, size of satellite droplets and/SDPs, location with respect to an image on the document (e.g., SDPs formed within a threshold distance of certain characters), location with respect to the substrate (e.g., particular regions of the documents), or the like.

The system may then query a database that includes SDP based document signatures for a record that matches the extracted image portions including the one or more SDPs (606)—as discussed above. "Matching" in this context may be relative to a threshold confidence level rather than a binary decision. The requisite confidence level may vary depending on the specific application. The confidence level required may be varied dynamically responsive to the data, image resolution, age of the target document, or the like. It should be noted that matching may be performed individually and/or jointly at one or more of satellite droplet level, the SDP level, a document region level, and/or the document level.

If a "matching" record is found (608: YES), the target document may be authenticated (610). However, if no "matching" record is identified, (610: NO), the target document may not be authenticated (612). The results may be returned to a user.

It should be noted that once an original printed document has been fingerprinted to generate a document signature, the current disclosure allows for region-by-region matching may be used to identify (if any) regions have been changed. Thus, for example, the system might get a really good overall match on a passport but none of the matches happen in a particular passport page/region-so the system may determine that the page/region probably was counterfeited. Additionally and/or alternatively, aspects of the present disclosure can be applied not only to detect a forged or altered document (or regions thereof), but to identify in some cases the source of the bogus document based on the changes in the SDPs that may be characteristic of certain print devices.

Figure 7:
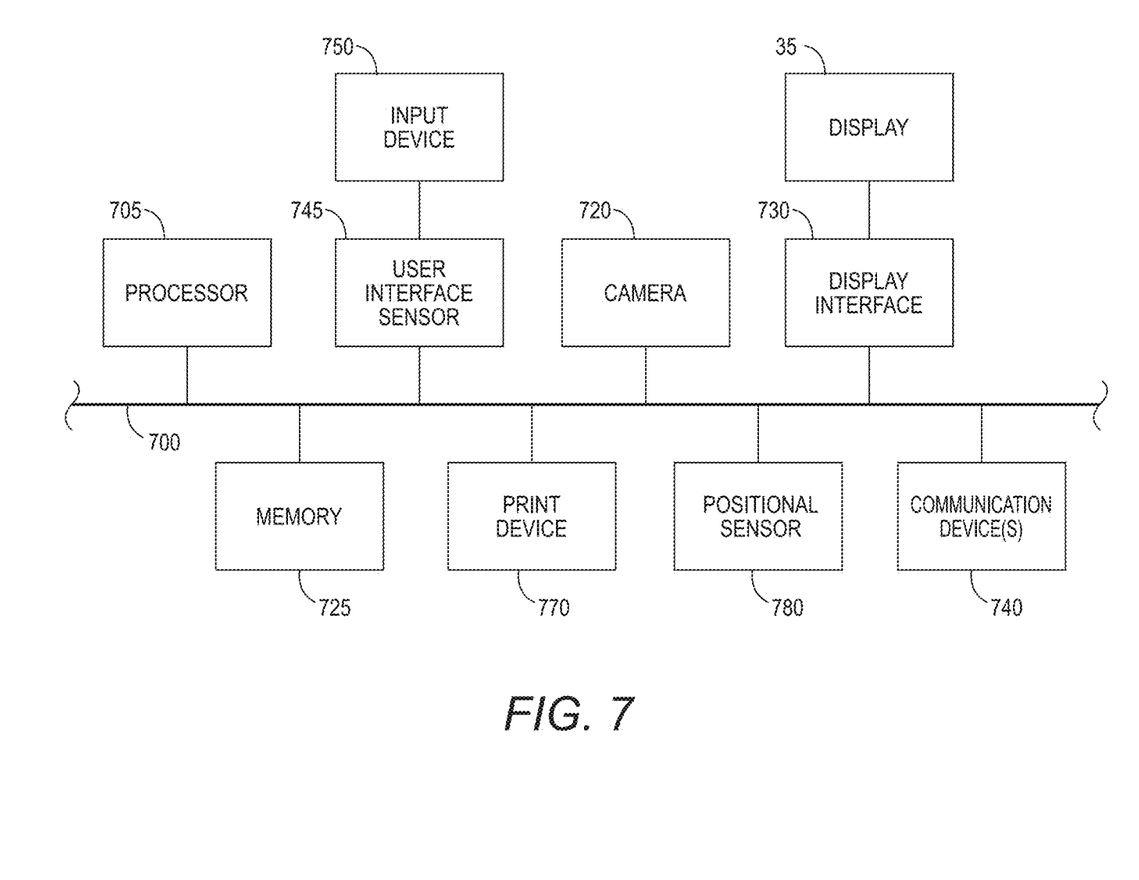
FIG. 7 illustrates example components of computing devices that may be used for by or as various entities of the system.

FIG. 7 depicts an example of internal hardware that may be included in any of the electronic components of the system, such as the fingerprint generator, the fingerprint reader, or a local or remote computing device in the system. An electrical bus 700 serves as a communication path via which messages, instructions, data, or other information may be shared among the other illustrated components of the hardware. Processor 705 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 725. A memory device may include a single device or a collection of devices across which data and/or instructions are stored.

An optional display interface 730 may permit information to be displayed on a display device 735 in visual, graphic, or alphanumeric format. An audio interface and audio output (such as a speaker) also may be provided. Communication with external devices may occur using various communication devices 740 such as a wireless antenna, a radio frequency identification (RFID) tag and/or short-range or near-field communication transceiver, each of which may optionally communicatively connect with other components of the device via one or more communication systems. The communication device 740 may be configured to be communicatively connected to a communications network, such as the Internet, a local area network or a cellular telephone data network.

The hardware may also include a user interface sensor 745 that allows for receipt of data from input devices 750 such as a keyboard, a mouse, a joystick, a touchscreen, a touch pad, a remote control, a pointing device and/or microphone. Digital image frames also may be received from a camera 720 that can capture video and/or still images. The system also may include a positional sensor 780 to detect position and movement of the device. Examples of positional sensors 780 include a global positioning system (GPS) sensor device that receives positional data from an external GPS network.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, various embodiments can operate with software, hardware, and/or operating system implementations other than those described in this document.

Terminology that is relevant to this disclosure includes:

A "printer" or "print device" is an electronic device that is capable of receiving commands and/or data, and in response printing characters and/or images on a substrate. Print devices may include, but are not limited to, network printers, production printers, copiers and other devices using ink or toner, and multifunction devices that perform a combination of functions such as printing and scanning.

An "electronic device" or a "computing device" refers to a device or system that includes a processor and memory.

Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. As used in this description, a "computing device" or "electronic device" may be a single device, or any number of devices having one or more processors that communicate with each other and share data and/or instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container also may be considered an electronic device. In the discussion above, a client device, server device, virtual machine or container may be referred to simply as a "device" for brevity. Additional elements that may be included in electronic devices are discussed above in the context of FIG. 7.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices. The network may include or is configured to include any now or hereafter known communication networks such as, without limitation, a BLUETOOTH® communication network, a Z-Wave® communication network, a wireless fidelity (Wi-Fi) communication network, a ZigBee communication network, a HomePlug communication network, a Power-line Communication (PLC) communication network, a message queue telemetry transport (MQTT) communication network, a MTConnect communication network, a cellular network a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. As such, network 204 may be configured to implement wireless or wired communication through cellular networks, WiFi, BlueTooth, Zigbee, RFID, BlueTooth low energy, NFC, IEEE 802.11, IEEE 802.15, IEEE 802.16, Z-Wave, Home Plug, global system for mobile (GSM), general packet radio service (GPRS), enhanced data rates for GSM evolution (EDGE), code division multiple access (CDMA), universal mobile telecommunications system (UMTS), long-term evolution (LTE), LTE-advanced (LTE-A), MQTT, MTConnect, CoAP, REST API, XMPP, or another suitable wired and/or wireless communication method. The network may include one or more switches and/or routers, including wireless routers that connect the wireless communication channels with other wired networks (e.g., the Internet). The data communicated in the network may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, MTConnect protocol, or any other protocol.

In this document, "authenticating" or "validating" a document refers to determining whether the document is the original document, i.e., whether the document has been altered while it was in the hard copy form. Alteration may occur due to deliberate effort or accidental events.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method for verifying authenticity of a printed document, the method comprising, by a processor:
   receiving an identification of a portion of the printed document, the portion including a document signature;
   receiving, from a data store, a document signature corresponding to the printed document, the document signature comprising images of one or more first satellite droplet patterns (SDPs) each of the one or more first SDPs comprising a plurality of ink satellite droplets that were randomly formed during printing of a print image on the printed document;
   receiving an image of the portion of the printed document;
   analyzing the image to identify one or more second SDPs in the printed document; and
   authenticating the printed document by determining whether at least a subset of the one or more first SDPs match a corresponding subset of the one or more second SDPs.

2. The method of claim 1, further comprising determining that the printed document is not an authentic document in response to determining that the subset of the one or more first SDPs does not match the corresponding subset of the one or more second SDPs.

3. The method of claim 2, further comprising analyzing portions of the subset of the one or more first SDPs that do not match the corresponding subset of the one or more second SDPs for identifying portions of the printed document that have been altered from an original printed document.

4. The method of claim 1, further comprising:
selecting, by analyzing an image of an original printed document, the portion that includes the document signature comprising the one or more first SDPs;
generating the document signature to include images of the one or more first SDPs; and
storing the document signature in the data store in association with a document identifier of the original printed document and the identification of the portion.

5. The method of claim 4, wherein selecting the portion comprises selecting a predefined location within the original printed document.

6. The method of claim 4, wherein selecting, by analyzing the image of the original printed document, the one or more first SDPs comprises selecting the one or more first SDPs such that each of the one or more first SDPs is unduplicable.

7. The method of claim 4, further comprising selecting, by analyzing the image of the portion of the original printed document, each of the one or more first SDPs based on at least one of the following factors: a density of ink satellite droplets in a SDP, a number of ink satellite droplets in a SDP, sizes of ink satellite droplets in a SDP; size of a SDP; a location of a SDP in the original printed document; image quality of a SDP; spatial configuration of a SDP; a color of a SDP; or a shape of a SDP.

8. The method of claim 1, further comprising causing a print device to create the original printed document to include the one or more first SDPs by controlling an energy pulse applied to a print nozzle of the print device for selective enhancement of ink satellite droplets.

9. The method of claim 1, wherein retrieving, from the data store, the document signature comprises using a document identifier associated with the printed document for retrieving the document signature.

10. The method of claim 1, wherein analyzing the image to identify the one or more first SDPs in the printed document comprises identifying the one or more first SDPs based on at least one of the following factors: a density of ink satellite droplets in a SDP; a number of ink satellite droplets in a SDP; sizes of ink satellite droplets in a SDP; size of a SDP; location of a SDP in the original printed document; image quality of a SDP; a color of a SDP; or a shape of a SDP.

11. A system for verifying authenticity of a printed document, the system comprising:
a processor; and
a non-transitory computer readable medium comprising programming instructions that when executed by the processor cause the processor to:
receive an identification of a portion of the printed document, the portion including a document signature;
receive, from a data store, a document signature corresponding to the printed document, the document signature comprising images of one or more first satellite droplet patterns (SDPs) each of the one or more first SDPs comprising a plurality of ink satellite droplets that were randomly formed during printing of a print image on the printed document;
receive an image of the portion of the printed document;
analyze the image to identify one or more second SDPs in the printed document;
authenticate the printed document by determining whether at least a subset of the one or more first SDPs match a corresponding subset of the one or more second SDPs.

12. The system of claim 11, further comprising programming instructions that when executed by the processor cause the processor to determine that the printed document is not an authentic document in response to determining that the subset of the one or more first SDPs does not match the corresponding subset of the one or more second SDPs.

13. The system of claim 12, further comprising programming instructions that when executed by the processor cause the processor to analyze portions of the subset of the one or more first SDPs that do not match the corresponding subset of the one or more second SDPs for identifying portions of the printed document that have been altered from an original printed document.

14. The system of claim 11, further comprising programming instructions that when executed by the processor cause the processor to:
select, by analyzing an image of an original printed document, the portion that includes the document signature comprising the one or more first SDPs;
generate the document signature to include images of the one or more first SDPs; and
store the document signature in the data store in association with a document identifier of the original printed document and the identification of the portion.

15. The system of claim 14, wherein the programming instructions that when executed by the processor cause the processor to select the portion comprise programming instructions that cause the processor to select a predefined location within the original printed document or a location.

16. The system of claim 14, wherein the programming instructions that when executed by the processor cause the processor to select, by analyzing the image of the original printed document, the one or more first SDPs comprise programming instructions that cause the processor to select the one or more first SDPs such that each of the one or more first SDPs is unduplicable.

17. The system of claim 14, further comprising programming instructions that when executed by the processor cause the processor to select, by analyzing the image of the portion of the original printed document, each of the one or more first SDPs based on at least one of the following factors: a density of ink satellite droplets in a SDP; a number of ink satellite droplets in a SDP; sizes of ink satellite droplets in a SDP; size of a SDP; a location of a SDP in the original printed document; image quality of a SDP; spatial configuration of a SDP; a color of a SDP; or a shape of a SDP.

18. The system of claim 11, further comprising programming instructions that when executed by the processor cause the processor to cause a print device to create the original printed document to include the one or more first SDPs by controlling an energy pulse applied to a print nozzle of the print device for selective enhancement of ink satellite droplets.

19. The system of claim 11, wherein the programming instructions that when executed by the processor cause the processor to retrieve, from the data store, the document signature comprise programming instructions to cause the processor to use a document identifier associated with the printed document for retrieving the document signature.

20. The system of claim 11, wherein the programming instructions that when executed by the processor cause the processor to analyze the image to identify the one or more first SDPs in the printed document comprise programming instructions to cause the processor to identify the one or more first SDPs based on at least one of the following factors: a density of ink satellite droplets in a SDP; a number of ink satellite droplets in a SDP; sizes of ink satellite droplets in a SDP; size of a SDP; location of a SDP in the original printed document; image quality of a SDP; a color of a SDP; or a shape of a SDP.

* * * * *